Dec. 2, 1930.  V. PATRICOLO  1,783,387
SHOCK ABSORBER
Filed April 8, 1929
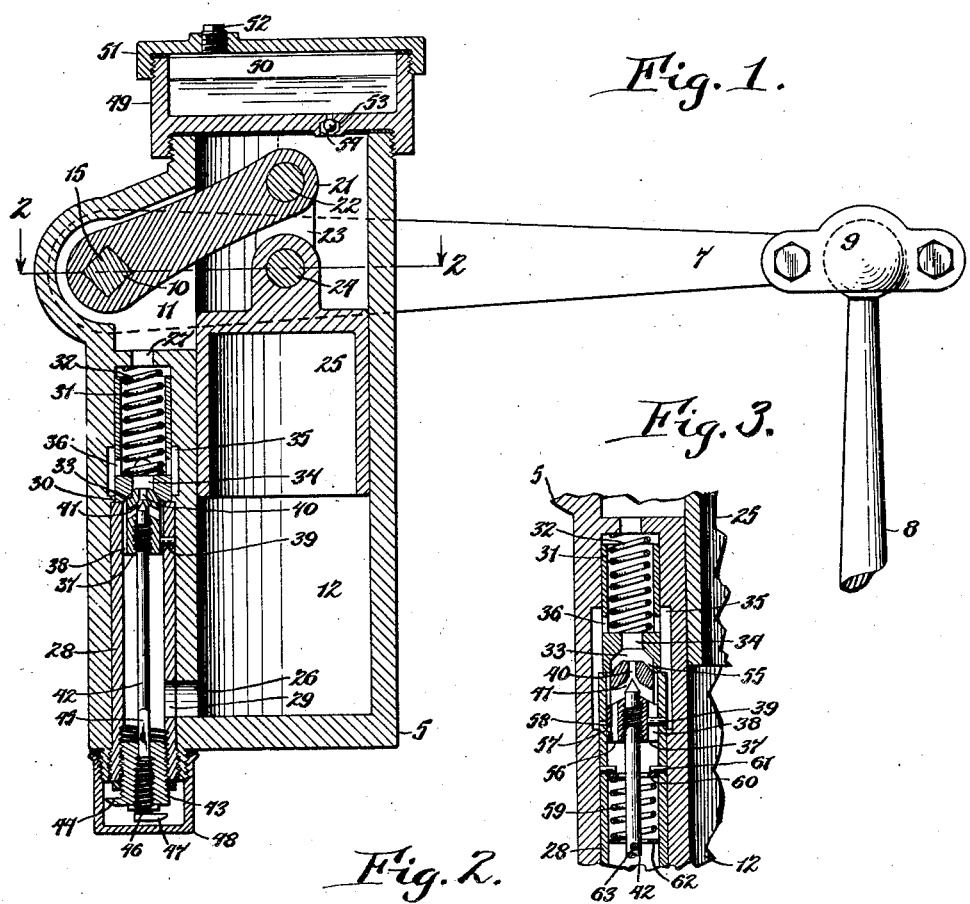
Fig. 1.
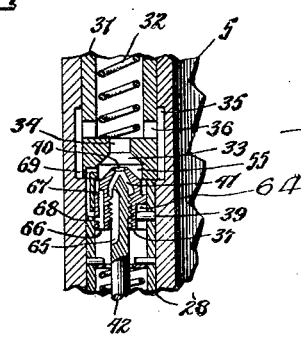
Fig. 3.
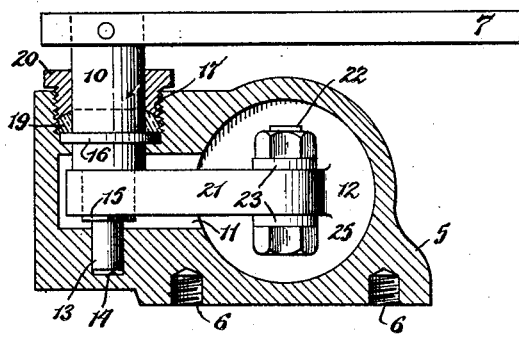
Fig. 2.
Fig. 4.
Inventor
Vincent Patricolo
By Popp + Powers
Attorneys Patented Dec. 2, 1930

1,783,387

UNITED STATES PATENT OFFICE

VINCENT PATRICOLO, OF BUFFALO, NEW YORK

SHOCK ABSORBER

Application filed April 8, 1929. Serial No. 353,592.

This invention relates to a shock absorber and more particularly to a double acting fluid or hydraulic shock absorber which is designed for the purpose of cushioning or absorbing the shocks imparted to spring supported vehicles when traveling over rough or uneven roads, although the same is so designed that it can be adjusted to provide a single acting shock absorber which will cushion the rebound movement of the vehicle spring but allow substantially free compression thereof.

The principal object of this invention is to provide a double acting shock absorber of this character in which the amount of resistance which the shock absorber offers to both the compression and rebound movements of the vehicle spring can be independently adjusted from the exterior of the shock absorber casing.

A further object is to provide such a shock absorber in which such adjustment is effected by two screws, one of which is contained within the other end and in which the different positions of adjustment of each screw can be clearly marked so as to facilitate the adjustment of the shock absorber.

Another aim is to provide such a shock absorber in which provision is made to take care of excess shocks, such provision including means whereby relief passages are opened and permit a by-pass of the fluid under pressure to avoid breaking any parts of the shock absorber under such severe shocks.

A further purpose is to provide means which provide such a free passage of oil during the riding range of movement of the vehicle springs, that is, when the vehicle is riding over slightly uneven roads and is flexed only a small degree, it is undesirable to resist its movement and the present invention therefore provides for the free passage of the oil or other fluid during this movement of the spring.

Other objects are to provide a hydraulic shock absorber of this character which is simple in construction, which will act with powerful checking force upon the rebound or compression movements of the vehicle spring depending upon the adjustment of the shock absorber, which is easy to manufacture and assemble and can be produced at low cost, which will function for a long time under severe conditions of use and not get out of order, and in which a reserve supply of oil is provided so that the operating chambers will always be completely filled and the shock absorber operate under full efficiency.

In the accompanying drawings:

Fig. 1 is a vertical longitudinal section through a shock absorber embodying the preferred form of my invention and showing the operating arm and a part of its universal connection with the vehicle spring.

Fig. 2 is a horizontal section taken on line 2—2, Fig. 1.

Fig. 3 is a fragmentary vertical section through the valve mechanism of the shock absorber shown in Fig. 1 and showing a modified form of the invention.

Fig. 4 is a view similar to Fig. 3 and showing a further modification of the invention.

Similar characters of reference indicate like parts in the several figures of the drawings.

In accordance with standard practice a shock absorber embodying the present invention includes a casing or housing 5 which is adapted to be rigidly secured to the chassis or frame of the automobile in any suitable manner, as by the provision of threaded openings 6 which are adapted to receive attaching screws, (not shown), an operating arm 7 which is secured to the housing or casing 5 and is adapted to actuate the mechanism contained therein, and a link or bar 8 which has a universal connection 9 with the outer end of the arm 7 and is secured by means of a universal connection (not shown) to the vehicle spring in any suitable manner. It is therefore apparent that the movement of the vehicle spring effects a corresponding movement of the arm 7 and will be resisted in its movement by resistance to the movement of the arm 7.

The arm 7 is secured to a rock shaft 10 which is journaled in the casing 5 in any suitable manner and extends through a chamber 11 which opens into a cylinder 12. As shown this rock shaft 10 is provided with a reduced neck 13 which fits into a recess 14, is formed to provide a squared part 15 within the chamber 11, and is formed to provide a collar 16 which is received in a large threaded recess 17 in the casing. This recess 17 also receives a packing 19 and a gland nut 20 and thereby operates as a stuffing box to prevent the escape of oil. On the squared part 15 of the rock shaft 10 an arm 21 is mounted so as to turn therewith, this arm extending into the cylinder 12. At its outer end this arm 21 carries a bolt 22 which connects this arm with a pair of links 23, the lower end of these links being connected by a bolt or pin 24 with a piston 25. It is therefore apparent that by this means the movement of the vehicle spring will be transmitted to the piston 25 and that resistance to the movement of this piston will resist the movement of the spring. To adjustably resist the movement of the piston 25 in either direction a valve mechanism is provided which in the preferred construction is constructed as follows:

A cylindrical by-pass is formed in the casing 5 below the arm 21, this by-pass communicating by means of a port 26 with the lower end of the cylinder 12 and by a port 27 with the chamber 11. The outer end of this cylindrical by-pass is open and in the by-pass is screwed a sleeve 28, this sleeve having a port 29 which registers with the port 26 and permits the free flow of fluid from the interior of the sleeve 28 to the lower end of the cylinder 12 and vice versa. The upper end of this sleeve 28 abuts against a bead or shoulder 30. Against the upper end of the sleeve 28 a member 31 is yieldingly held by means of a compression spring 32, this member forming a yielding valve seat. This valve seat member is of hollow cylindrical form and is open at its upper end and at its lower end is formed to provide a conical valve seat 33 which opens into a passage 34, this passage 34 opening into the interior of the seating member. The compression spring 32 is arranged within the valve seat member and is interposed between the casing 5 and the valve seat member so as to yieldingly hold the valve seat member in its depressed position against the sleeve 28 on which it seats.

Above the bead 30 the housing or casing is formed to provide an annular recess 35 which is constantly in communication with the interior of the valve seat member 31 through a series of ports 36 in the wall of the valve seat member 31. An adjustable valve member 37 coacts with the valve seat 33, this valve member 37 being formed at its upper end to provide a conical face which engages with the conical seat 33. Along the sides of the valve member 37 vertical channels 38 are provided and into one of these channels a pin 39 projects, this pin being secured to the sleeve 28 and operating to hold the valve 37 against rotary movement.

A vertical passage 40 extends through the valve member 37, the upper end of this passage being formed to provide a conical valve seat 41 and a lower end being threaded to receive a needle valve 42, the upper end of this needle valve being threaded so as to move the valve member 37 vertically when it is turned and the extreme upper end of this needle valve 42 having a conical point which is adapted to coact with the valve seat 41 in the valve 37. From the passage 40 lateral passages are provided which open into the channels 38 and permit the free flow of oil to the end of the needle valve 42.

The lower end of the sleeve 28 is threaded and receives a nut 43 which is formed to provide a pointer or indicator 44. This nut 43 is provided with a vertical passage extending therethrough, the lower end thereof being threaded and the upper end thereof being squared and receiving the lower squared or flattened end 45 of the needle valve 42. It is therefore apparent that when the nut 43 is turned it will turn the needle valve 42 and adjust the same toward and from its seat 41 in the valve member 37. The needle valve 42, however, is free to move lengthwise relative to the nut 43 and in adjustably limiting the downward movement of this needle valve 42 a screw 46 is provided which turns in the outer end of the vertical passage through the nut 43 and is provided with a pointer 47 to indicate its adjusted position. Suitable lock nuts are provided both for the nut 43 and the adjusting screw 46 and a screw cap 48 preferably encloses the outer ends of these members and is screwed against the casing 5, a suitable gasket being provided to prevent oil leakage.

With the above organization and with the cylinder 12, chamber 11 and by-pass passage filled with oil or other liquid, on the compression of the spring the arm 7 is moved up which in turn raises the piston 25. This movement of the piston forces the oil from the upper end of the cylinder 12 through the chamber 11, port 27, interior of the valve seat member 31 and port 34 against the upper end of the valve member 37. This pressure forces the valve member 37 downwardly until the lower end of the needle valve 42 strikes the adjusting screw 46, and this opening movement permits the oil to escape past the valve seat 33, through the channels 38 to the interior of the sleeve 28 from which it also passes through ports 29 and 26 to the lower end of the cylinder 12. It is also apparent that on the upstroke of the piston 25 the oil is also free to escape through the passage 40 in the valve member 37, past the needle valve 42 and out through the passages between the central passage 40 and the side channels 38, but since this passage is restricted by the needle valve only a small portion of the liquid escapes in this manner.

On the rebound movement of the vehicle spring which requires the greater degree of cushioning the arm 7 and piston 25 are moved downwardly. Such movement of the piston 25 causes a pressure to be built up in the lower end of the cylinder 12 and the oil passes through the ports 26 and 29, interior of the sleeve 28 and forces the valve member 37 against its seat 33. Since the valve member 37 is moved against its seat the oil under pressure is required to flow from the interior of the sleeve 28, through the channels 38, passage 40 in the valve member 37, past the end of the needle valve 42 and through the port 34 into the interior of the seating member 31 from which it is free to pass to the upper end of the cylinder 12. Since the needle valve 42 is adjusted to provide a restricted flow, the flow of oil in this direction is greatly retarded and hence the resistance to the movement of the piston 25 is proportionally greater on its down stroke as compared with its upstroke.

To adjust the shock absorber to any desired resistance of the shock absorber to movement of the spring in either direction it is only necessary to adjust the nut 43 and the screw 46. If it is desired to increase or decrease the resistance of the shock absorber to the rebound movement of the spring, which movement causes the piston 25 to be moved downwardly, it is only necessary to manipulate the nut 43, since upon turning this nut the needle valve 42 is turned and since the valve member 37 is held against rotation such turning of the needle valve 42 will move its point toward and from its seat 41 and thereby provide the desired restriction to the flow of oil on the down stroke of the piston 25. To adjust the resistance of the shock absorber to the spring on its compression movement, in which the piston 25 is moved upwardly it is only necessary to adjust the screw 46 since this screw determines the distance which the valve member 37 can be forced away from its seat 33 and hence regulates the resistance between this valve member and its seat. The threads of the nut 43 and the screw 46 are preferably so proportioned that the adjustment of the screw 46 is not disturbed by turning the nut 43.

When an excessive rebound movement of the spring is encountered, it is apparent that this pressure will be transmitted to the lower end of the valve seat member 31 and if high enough will raise the valve seat member past the bead 30, under which condition the oil under pressure can escape through the annular groove 35 and ports 36 without having to pass the needle valve 42. By this means a relief is provided under severe shocks which decreases the danger of breaking the parts as well as rendering the shock absorber more comfortable in its action.

In order to function in the most satisfactory manner it is desirable that the shock absorber be completely filled with oil, so that the piston on its down stroke will have a suction effect in the upper part of the cylinder 12 as well as a compressive action on the fluids in the lower end of the cylinder, and vice versa. To insure this condition, the upper end of the cylinder 12 is closed by a cap 49 which is formed on its upper side to provide a reservoir 50, the upper end of this reservoir being closed by a second cap 51, suitable gaskets being provided at all joints. The cap 51 is provided with a filling plug 52 and a passage 53 is formed in the reservoir cap 49, this passage being provided with a ball check 54 which permits the passage of oil from the reservoir 50 to the cylinder 12 but prevents a reverse flow. It is therefore apparent that on each down stroke of the piston the ball check 54 is opened and hence should oil leak from the cylinder 12, a small quantity of oil would be withdrawn from the reservoir 50. On the up stroke of the piston 25, however, the ball check is closed and hence prevents oil from being forced from the cylinder 12 to the reservoir 50.

The modified form of the invention shown in Fig. 3 is designed to provide a free or unresisting movement of the shock absorber during the riding range of movement of the spring. To provide the maximum riding comfort it is desirable that the vehicle spring function normally when riding over smooth streets and when the movement of the spring is comparatively slight. The present invention therefore proposes a relief means whereby the piston 25 can move without appreciable resistance under the influence of such minor movements of the vehicle spring.

For this purpose the movable seat member 31 is formed with a cylindrical recess 55 in which the valve member 37 moves and the annular relief groove 35 is extended downwardly around the fixed sleeve 28, the seat member 31 seating on the end of the sleeve 28. The valve member 37 is also provided with a longitudinal passage 56 and this passage is provided with a port 57 which, during the movement of the valve member under the influence of minor movements of the piston 25, registers with a port 58 in the fixed sleeve 28. In this construction a return spring 59 is preferably provided for the valve member 37. This return spring 59 is held between a washer 60 held by two pins 61 in the sleeve 28 and a washer 62 held by a pin 63 on the needle valve 42.

With this construction upon the compression movement of the vehicle spring, the piston is moved up and the oil passes through the chamber 11, port 27, interior of the seat member 31, port 34, forcing the valve member 37 down until the needle valve stem 42 engages the screw 46 as shown in Fig. 1, this screw 46 being so adjusted as to provide a clearance between the valve member 37 and the lower end of the seat member 31 sufficient to effect the desired resistance to the flow of oil. The oil then escapes through the channels 38 and port 26 to the lower end of the cylinder 12. This action is therefore substantially as described with reference to the preferred construction.

During the normal riding range of movement of the vehicle spring, the piston 25 is moved down slightly and the oil passing through the port 26 shifts the valve member 37 until the port 56 registers with the port 58 in the fixed sleeve 28. The oil under pressure thereupon escapes through the passage 56, ports 57 and 58, relief groove 35, ports 36 and 27, and chamber 11 to the upper end of the cylinder 12. The ports 57 and 58 thereby provide a relief during the riding range of movement of the spring which forms a comparatively slight resistance to the movement of the vehicle spring during such movement and therefore provides the maximum riding comfort at this time.

Under a more severe rebound, however, the valve member 37 is forced up until the relief ports 57 and 58 are out of register and the valve seats against the conical seat 33, the oil being forced to pass the needle valve 42 as in the preferred construction, this needle valve offering a substantial resistance to the flow of oil and acting with powerful checking force on the vehicle spring.

As in the preferred construction, when an excessively great rebound of the vehicle spring takes place, the high oil pressure built up in the lower end of the cylinder 12, sleeve 28 and channels 38 of the valve member 37, lifts the seat member 31 from its seat on the upper end of the sleeve 28 and permits the oil to escape directly through the relief groove 35 and ports 36 in the seat member, thereby avoiding breaking of the parts.

The construction shown in Fig. 4 shows a further modification of the invention in which a free riding range of movement of the vehicle spring is provided. In this construction the channels 38 are eliminated and the valve member 37 is in the form of a piston which rides in the sleeve 28 and a channel 64 is provided which receives the end of the guide pin 39 but does not extend to the upper end of the valve member 37 as in the preferred construction. The escape of oil past the needle valve 42 is effected by providing a longitudinal slot 65 across the upper threads of the needle valve 42 and a passage 66 extends upwardly from the bottom of the valve member 37 and has two ports 67 and 68, the lower one 67 being arranged to register, during the riding range of movement of the vehicle spring and valve member 37, with a passage 69 which extends through the sleeve 28 and seat member 31 and opens immediately below the seat 33. The other port 67 opens above the valve member 37 but is cut off when the valve member 37 is raised to engage the lower end of the seating member 31.

With this organization during normal riding oscillations of the vehicle spring, the valve member 37 is raised sufficiently to bring the port 68 into register with the passage 69, the port 67 being cut off at this time. This permits the oil to escape comparatively freely through the port 26, passage 66, port 68, passage 69, ports 34 and 27 and chamber 11 in both directions of oil flow during such normal riding movements of the vehicle spring.

When, however, the compression movement of the spring is greater than the normal riding range, the valve member 37 is moved down until the needle valve stem 42 is stopped by the screw 46 as described with reference to the preferred construction in which position the port 68 is out of register with the passage 69 and the oil is therefore forced to flow from the upper end of the cylinder 12, through chamber 11, ports 27 and 34 between the restricted space between the valve member 37 and the lower end of the seat member 31 which retards the flow proportionate to the adjustment of the screw 46, through the port 67, passage 66 and port 26 to the lower end of the cylinder 12.

During greater than normal rebound movement of the vehicle spring, the oil passes from the lower end of the cylinder 12 through the port 26 and forces the valve member 37 to its seat 33. The oil thereupon escapes through the groove or slot 65 and past the needle valve 42 through the ports 34 and 27 to the upper end of the cylinder, this flow being resisted by the constriction formed by the needle valve. During excessive rebound movements of the spring, the oil pressure built up below the seat member 31 is sufficient to raise it from its seat on the upper end of the fixed sleeve 28 against the resistance of the spring 32 and permit the relief of the oil pressure through the annular groove 35 and ports 36.

Each of the forms of this invention provide a simple and inexpensive double acting hydraulic shock absorber in which the resistance to the flow of oil or fluid either during compression or rebound movements of the vehicle spring can be quickly, conveniently and independently adjusted to give any desired resisting effect. The same also provides for a relief under excessive strains to avoid breaking of any of the parts and provides for a free or unresisting movement of the shock absorber during the normal riding movement of the vehicle spring. The present shock absorber also has liquid replenishing means to insure the proper quantity of liquid in the shock absorber at all times and is designed to stand up under severe and constant service without excessive wear and without getting out of adjustment.

I claim as my invention:

1. A hydraulic shock absorber, including a housing having a cylinder and a by-pass between the ends of said cylinder, a piston in said cylinder, means for reciprocating said piston through motion derived from the vehicle spring, said by-pass being formed to provide a seat, a movable valve member arranged in said by-pass and movable by liquid pressure toward and from said seat, said valve member being provided with a passage extending therethrough, valve means arranged in said passage, a stem for regulating said valve means and projecting outwardly from said valve member, and means for adjustably limiting the movement of said stem to limit the movement of said valve member away from said seat.

2. A hydraulic shock absorber, including a housing having a cylinder and a by-pass between the ends of said cylinder, a piston in said cylinder, means for reciprocating said piston through motion derived from the vehicle spring, said by-pass being formed to provide a seat, a movable valve member arranged in said by-pass and movable by liquid pressure toward and from said seat, said valve member being provided with a passage extending therethrough, valve means arranged in said passage, a stem for regulating said valve means and projecting outwardly from said valve member and means for adjustably limiting the movement of said stem to limit the movement of said valve member away from said seat, comprising a screw carried by said housing and engaging the end of said stem.

3. A hydraulic shock absorber, including a housing having a cylinder and a by-pass between the ends of said cylinder, a piston in said cylinder, means for reciprocating said piston through motion derived from the vehicle spring, said by-pass being formed to provide a seat, a valve member arranged in said by-pass and movable by liquid pressure toward and from said seat, said valve member being provided with a passage extending therethrough, means for preventing rotary movement of said valve member, valve means arranged in said passage and controlling the flow of liquid therethrough, a stem connected with said valve member and adapted when turned to regulate said valve means, means carried by said housing for turning said stem but permitting longitudinal movement thereof, and means carried by said last named means for adjustably limiting the longitudinal movement of said stem to limit the movement of said valve member away from said seat.

4. A hydraulic shock absorber, including a housing having a cylinder and a by-pass between the ends of said cylinder, a piston in said cylinder, means for reciprocating said piston through motion derived from the vehicle spring, said by-pass being formed to provide a seat, a valve member arranged in said by-pass and movable by liquid pressure toward and from said seat, said valve member being provided with a recess extending therethrough, means for preventing rotary movement of said valve member, a needle valve having a screw connection with said valve member and adapted when turned to regulate the flow of liquid through said passage, means carried by said housing for turning the stem of said needle valve but permitting longitudinal movement thereof, and means carried by said last named means for adjustably limiting the longitudinal movement of said stem to limit the movement of said valve member away from its seat.

5. A hydraulic shock absorber, including a housing having a cylinder and a by-pass between the ends of said cylinder, a piston in said cylinder, means for reciprocating said piston through motion derived from the vehicle spring, said by-pass being formed to provide a seat, a valve member arranged in said by-pass and movable by liquid pressure toward and from said seat, said valve member being provided with a recess extending therethrough, means for preventing rotary movement of said valve member, a needle valve having a screw connection with said valve member and adapted when turned to regulate the flow of liquid through said passage, said needle valve including a stem projecting outwardly from said valve member and having an out of round end, a nut mounted in said housing and having a passage extending therethrough, the inner end of said passage being out of round and receiving the end of said valve stem whereby upon turning said nut said valve stem is turned to adjust said needle valve, said stem being free to slide longitudinally in said nut, the outer end of the passage through said nut being threaded, and a screw arranged in the outer end of said last named passage and limiting the outward movement of said stem and the movement of said valve member away from its seat.

6. A hydraulic shock absorber, including a housing having a cylinder and a by-pass between the ends of said cylinder, a piston in said cylinder, means for reciprocating said piston through motion derived from the vehicle spring, said by-pass being formed to provide a seat, a valve member arranged in said by-pass and movable by liquid pressure toward and from said seat, said valve member being provided with a recess extending therethrough, means for preventing rotary movement of said valve member, a needle valve having a screw connection with said valve member and adapted when turned to regulate the flow of liquid through said passage, said needle valve including a stem projecting outwardly from said valve member and having an out of round end, a nut mounted in said housing and having a passage extending therethrough, the inner end of said passage being out of round and receiving the end of said valve stem whereby upon turning said nut said valve stem is turned to adjust said needle valve, said stem being free to slide longitudinally in said nut, the outer end of the passage through said nut being threaded, a screw arranged in the outer end of said last named passage and limiting the outward movement of said stem and the movement of said valve member away from its seat, a pointer on said nut externally of said housing to indicate its adjusted position and a pointer on said screw externally of said nut to indicate its adjusted position.

7. A hydraulic shock absorber, including a housing having a cylinder, a by-pass between the ends of said cylinder, a piston in said cylinder and means for reciprocating said piston through motion derived from the vehicle spring, an open ended sleeve arranged in said by-pass and having a port permitting the flow of liquid through said by-pass, a seat member arranged at the inner end of said sleeve, a cylindrical valve member arranged in said sleeve and movable toward and from said seat, said valve member being provided with longitudinal external grooves, a pin carried by said sleeve and arranged in one of said grooves to prevent said valve member from turning, said valve member being provided with a passage extending therethrough, one end of said passage being formed to provide a reduced orifice and a conical valve seat, a needle valve having a screw connection with said valve member, the point of said needle valve being adapted when turned to be moved toward and from said seat and the stem of said needle valve projecting outwardly from said valve member and being out of round, a nut mounted in said housing and having a passage extending therethrough, the inner end of said passage being out of round and receiving the end of said valve stem whereby upon turning said nut said valve stem is turned to adjust said needle valve, said stem being free to slide longitudinally in said nut, the outer end of the passage through said nut being threaded, and a screw arranged in the outer end of said last named passage and limiting the outward movement of said stem and the movement of said valve member away from its seat.

8. A hydraulic shock absorber, including a housing having a cylinder, a by-pass between the ends of said cylinder, a piston in said cylinder and means for reciprocating said piston through motion derived from the vehicle spring, an open ended sleeve arranged in said by-pass and having a port permitting the flow of liquid through said by-pass, a seat member arranged at the inner end of said sleeve, a cylindrical valve member arranged in said sleeve and movable toward and from said seat, said valve member being provided with longitudinal external grooves, a pin carried by said sleeve and arranged in one of said grooves to prevent said valve member from turning, said valve member being provided with a passage extending therethrough, one end of said passage being formed to provide a reduced orifice and a conical valve seat, a needle valve having a screw connection with said valve member, the point of said needle valve being adapted when turned to be moved toward and from said seat and the stem of said needle valve projecting outwardly from said valve member and being out of round, a nut mounted in said housing and having a passage extending therethrough, the inner end of said passage being out of round and receiving the end of said valve stem whereby upon turning said nut said valve stem is turned to adjust said needle valve, said stem being free to slide longitudinally in said nut, the outer end of the passage through said nut being threaded, a screw arranged in the outer end of said last named passage and limiting the outward movement of said stem and the movement of said valve member away from its seat, and means for yieldingly supporting said seat member whereby said seat member moves away from said valve member under high liquid pressure and permits the free flow of liquid through said by-pass.

9. A hydraulic shock absorber, including a housing having a cylinder and a by-pass between the ends of said cylinder, a piston in said cylinder, means for reciprocating said piston through motion derived from the vehicle spring, a shoulder in said by-pass, a seat member arranged in said by-pass and having a passage extending therethrough, a spring holding said seat member against said shoulder, a longitudinally movable valve member arranged in said by-pass and movable by liquid pressure toward and from said seat member, means for adjustably limiting the movement of said valve member away from said seat member to regulate the flow of liquid in one direction, and means for adjustably permitting the flow of liquid in the opposite direction, said seat member being movable away from said valve member under excess liquid pressure and permitting the free flow of liquid through said by-pass.

10. A hydraulic shock absorber, including a housing having a cylinder and a by-pass between the ends of said cylinder, a piston in said cylinder, means for reciprocating said piston through motion derived from the vehicle spring, a shoulder in said by-pass, said by-pass being provided with an annular relief groove above said shoulder, a hollow seat member arranged in said by-pass above said shoulder and having a port communicating with said relief groove and a port at its lower end connected with the lower end of said by-pass, a spring yieldingly holding said seat member against said shoulder, a longitudinally movable valve member arranged in said by-pass below said seat member and movable by liquid pressure toward and from said seat member, means for adjustably limiting the movement of said valve member away from said seat member to regulate the flow of liquid in one direction through said by-pass, and means for adjustably permitting the flow of liquid in the opposite direction, said seat member being movable away from said valve member under excess liquid pressure and permitting the free flow of liquid through said relief groove.

11. A hydraulic shock absorber, including a housing having a cylinder and a by-pass between the ends of said cylinder, a piston in said cylinder, means for reciprocating said piston through motion derived from the vehicle spring, said by-pass having a seat, a valve member movable longitudinally in said by-pass by liquid pressure toward and from said seat, means for adjustably limiting the movement of said valve member away from said seat to regulate the restriction to the flow of liquid in one direction, means permitting a restricted flow of liquid in the opposite direction, and means associated with said valve member for permitting a free flow of liquid through said by-pass during the initial movement of said piston.

12. A hydraulic shock absorber, including a housing having a cylinder and a cylindrical by-pass between the ends of said cylinder, a piston in said cylinder, means for reciprocating said piston through motion derived from the vehicle spring, means forming a seat in said by-pass, a cylindrical valve member fitted in said by-pass and movable longitudinally under fluid pressure toward and from said seat, means for adjustably limiting the movement of said valve member away from said seat to regulate the restriction to the flow of liquid in one direction, and means permitting a restricted flow of liquid in the opposite direction, said valve member being provided with a passage extending from one end to the cylindrical wall thereof and adapted to register with a passage in said housing which opens into said by-pass on the opposite side of said seat, said passages being adapted to register when said valve member is moved in response to the initial movement of said piston and permit a free flow of liquid through said by-pass.

In testimony whereof I hereby affix my signature.

VINCENT PATRICOLO.